Patented Oct. 24, 1922.

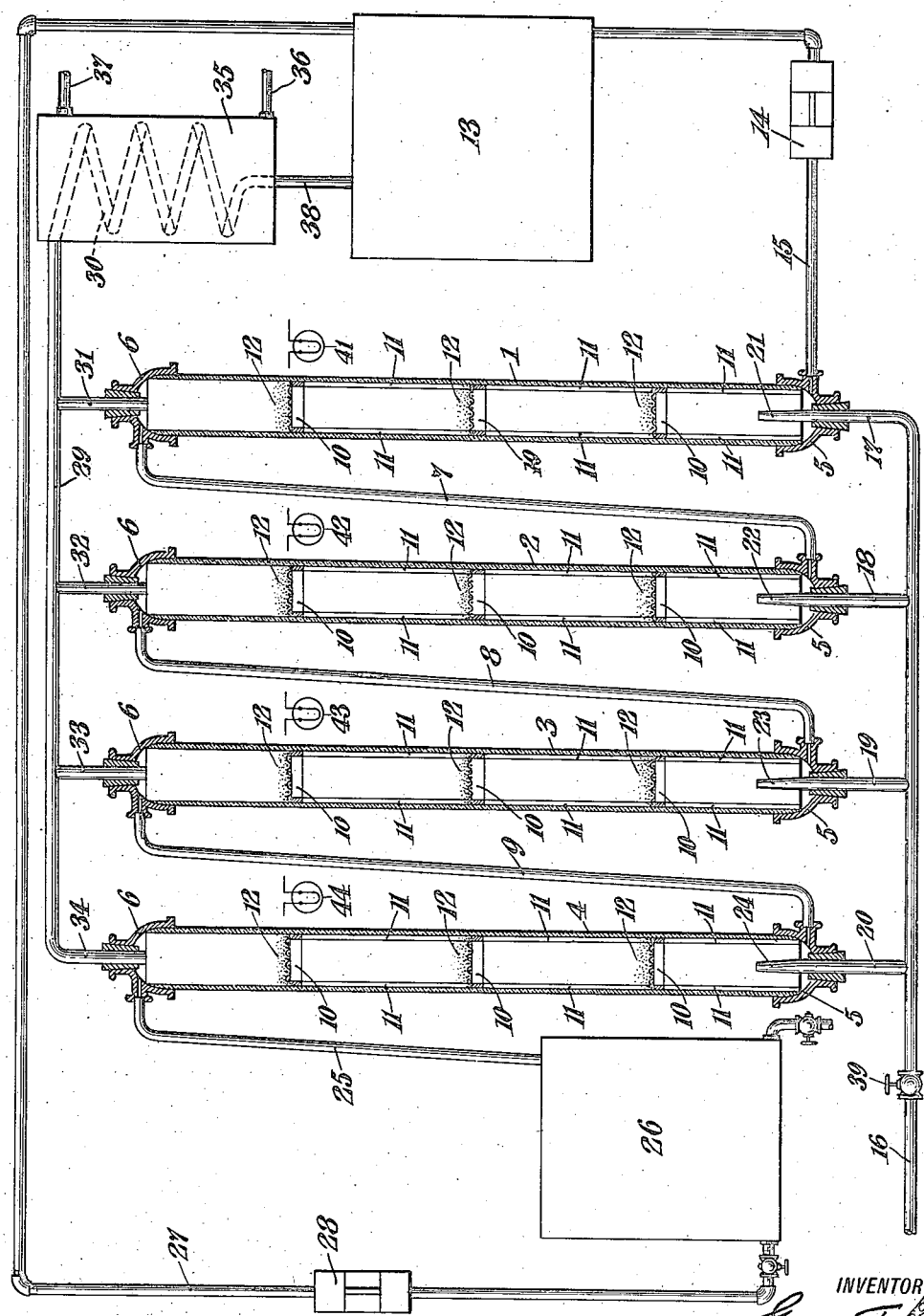

1,432,761

UNITED STATES PATENT OFFICE.

GEORGE TROYER KOCH, OF HOMER, OHIO, ASSIGNOR TO THE OHIO FUEL SUPPLY COMPANY, OF PITTSBURGH, PENNSYLVANIA, A CORPORATION OF OHIO.

MANUFACTURE OF CHLORINATED DERIVATIVES OF HYDROCARBONS.

Application filed May 4, 1920. Serial No. 378,830.

*To all whom it may concern:*

Be it known that I, GEORGE T. KOCH, a citizen of the United States, residing at Homer, in the county of Licking and State of Ohio, have invented certain new and useful Improvements in the Manufacture of Chlorinated Derivatives of Hydrocarbons; and I do hereby declare the following to be a full, clear, and exact description of the invention, such as will enable others skilled in the art to which it appertains to make and use the same.

My invention consists in the novel features hereinafter described, reference being had to the accompanying drawing which illustrates one form of apparatus by means of which my invention may be conveniently carried into effect, and said invention is fully disclosed in the following description and claims.

The invention relates to the manufacture of chlorinated derivatives of hydrocarbons of the series $C_n H_{2n+2}$, of paraffin series of hydrocarbons, by treating such hydrocarbons with chlorin in the presence of a catalyzer or chlorin carrier, in the manner hereinafter described. This invention is particularly valuable in the treatment of liquid members of the paraffin series with chlorin, and in the production of mixtures of chlorinated derivatives therefrom, the chlorination taking place in the liquid phase.

Many attempts have been made to chlorinate these hydrocarbons by mixing them with a predetermined amount of chlorin in the dark, and then passing this mixture of hydrocarbons and chlorin through transparent tubes before a mercury vapor light, or other source of actinic light, and depending upon the actinic value of the light as a catalyzer, to cause the re-action to take place, with the subsequent formation of chlorhydrocarbons. This method has been found to proceed more or less irregularly, and violently, and to result in the products varying in character and amount.

I have found that by causing the liquid hydrocarbons of the paraffin series to react with chlorin gas under the influence of actinic rays and in the presence of an absorbent such as silica gel, activated carbon, or pumice, in finely divided condition as a catalyzer, and passing the hydrocarbon liquid and chlorin gas through successive quantities of such absorbent, the re-action can be made to proceed more smoothly and regularly and quickly, and the resulting production of chlorhydrocarbons can be made more definite in character and amount. I have also found that the re-action can be further hastened and improved by impregnating the finely divided absorbent with metals or metal compounds.

According to my invention, the hydrocarbons are caused to re-act with chlorin in the presence of the absorbent catalyzing material under the influence of actinic rays of light, which further facilitates the chlorination of the liquid treated. As catalyzing material of the kind described, I prefer to employ one or more of the following substances, to wit,— silica gel, which is a hard transparent porous substance of high lustre, being the product obtained when water glass of definite specific gravity is treated with a hydrochloric acid of given strength; batchite, which is activated carbon, to wit anthracite or bituminous coal, which has been activated by treatment with superheated steam to remove the absorbed hydrocarbons; cocoanut charcoal (Dorsite), which is activated carbon, to wit carbonized cocoanut hulls, which have been activated by prolonged treatment with superheated steam; or pumice stone. All of these substances are of a porous structure and possess the property of absorbing large quantities of gases or vapors, and acting as a catalyzer in the chlorination of liquid hydrocarbons.

I prefer to use these porous catalyzing materials or absorbents in finely divided form and to circulate the liquid hydrocarbon with the chlorin through successive masses of the catalyzing material in the presence of actinic light rays, before described.

In the accompanying drawing I have illustrated diagrammatically one form of apparatus which I have found efficient and suitable for carrying out my improved process.

In this drawing, 1, 2, 3, 4, are re-action chambers, the walls of which are transparent to actinic rays of light, these chambers consisting preferably of glass tubes of suitable length and diameter, fitted into heads or reducers of acid resisting material, indicated at 5 and 6, in which they are firmly held by suitable cement, composed for example, of lead oxide and glycerine. One or more of these re-action chambers may be employed as preferred. They are preferably supported vertically and means are provided for circulating the liquid treated vertically, from the bottom to the top of the same. To this end where a series of re-action chambers are employed, the liquid is admitted to the lower end of the first chamber, as 1, the upper end of which is connected, as by a pipe 7, with the lower end of the chamber 2, the upper end of which is connected by a pipe, as 8, with the lower end of chamber 3, the upper end of which is connected by a pipe, as 9, with the bottom of the chamber 4, and so on according to the number of chambers used.

In each of the re-action chambers I provide means for supporting a mass or plurality of separate masses of the adsorbent catalyzing material. This may be conveniently accomplished by providing each of the tubular chambers with one or more acid resisting mesh trays, indicated at 10, which may be supported or spaced at suitable distances apart vertically in any desired way, as by spacers indicated at 11, which may be in the form of a supporting tripod, for example, or the trays may be held in position in any other desired way. The adsorbent catalyzer to be used, indicated at 12, is placed on these trays to the depth of about one quarter to three eighths of an inch, and is in finely divided condition. I prefer to use it after passing an 8—20 mesh, or of sufficiently large size to allow free passage of the chlorin and liquid hydrocarbons, but not small enough to pass through the meshes of the trays on which it rests. I prefer to impregnate the adsorbent or catalyzing material with metal or metal compounds, preferably nickel salts or copper salts, the nickel salts being preferred as giving the best results.

The liquid hydrocarbon to be treated may be drawn from a suitable receptacle, as 13, by means, for example, of a pump 14, or may be otherwise introduced through a pipe 15 into the lower end of the first re-action chamber 1. Chlorin gas from any suitable source will be supplied to a pipe 16 having branch pipes 17, 18, 19, and 20, one of which leads to the bottom of each of the re-action chambers within which it is provided with a discharge nozzle, the nozzles being indicated at 21, 22, 23, and 24 respectively. The upper end of the last of the series of re-action chambers is connected by means of a pipe 25 with a receptacle 26 for the chlorinated hydrocarbon, and as in some instances it may be desirable to recirculate the liquid hydrocarbon, the receptacle 26 may be conveniently connected with the receptacle 13 by means of a pipe 27, in which is located a circulating pump 28. The upper end of each of the re-action chambers is provided with a vapor escape pipe, which pipes are indicated at 31, 32, 33, and 34, and are connected to a common vapor line or pipe 29 leading to a condenser, in this instance comprising a coil 30, located in a tank 35 provided with a circulation of water or other cooling medium through pipes 36 and 37, the condenser being preferably connected by a pipe 38 with the tank 13, so that the condensed product may be returned to the special receptacle for liquid hydrocarbon, for further treatment. Adjacent to the transparent re-action chambers I provide means for subjecting the liquid hydrocarbon and gas to the action of actinic rays in conjunction with the use of the catalyzing material before described, and in the drawing I have indicated suitable electric lamps at 41 and 42, 43 and 44, which may be mercury vapor lamps, or other means for producing actinic light rays.

In carrying out my improved process with this type of apparatus the liquid paraffin hydrocarbon to be treated is forced from the tank 13 by the pump 14, or otherwise, into the first re-action chamber, and chlorin gas is supplied to the nozzles at the lower ends of all of the re-action chambers. The liquid hydrocarbon and chlorin gas pass upwardly in the first re-action chamber through successive masses of finely divided adsorbent or porous catalyzing material, and in the presence of the actinic light rays, if the lamps are employed. The liquid hydrocarbon, when it reaches the top of one re-action chamber, passes to the bottom of the next re-action chamber in which it rises in the same manner through successive masses of the adsorbents or catalyzing material described, and so on, the liquid being circulated vertically through the series of re-action chambers, mingling with the chlorin gas and passing through the successive spaced masses of adsorbent or catalyzing material. Any vapors evolved are drawn off from the upper end of each re-action chamber and pass to the condenser coil 30, the liquid being returned to the tank 13 for further treatment and being re-circulated through the system. After passing through all of the re-action chambers, the liquid leaving the last re-action chamber, passes through the pipe 25 to the storage tank 26. In using the apparatus, the re-action is at all times under control and may be carried on to any desired point, by regulating the speed of the flow of liquids through the re-action chambers, by regulating the amounts of chlorin fed into the re-action chambers, by a valve 39 in the chlorin pipe 16, for example, by varying the number of re-action chambers employed, or by re-circulating the liquid through the pipe 27 to the pipe 13 and passing it any desired number of times through the system of re-action chambers employed.

It has been found that the adsorbent silica gel, batchite, cocoanut charcoal, pumice stone, or other similar solid substance of porous structure, impregnated with metals or metallic compounds, is not altered during the course of the re-action, its function being purely that of a catalyzer and chlorin carrier, and the material may be used for long periods of time without change or renewal if kept free from moisture. While I have found the type of apparatus herein shown and described advantageous for carrying my invention into effect, I wish it to be understood that I do not limit myself to the use of this specific apparatus, and that variations may be made therein, without departing from my invention.

What I claim and desire to secure by Letters Patent is:—

1. The herein described method of chlorinating liquid paraffin hydrocarbons, which consists in treating a liquid paraffin hydrocarbon, in the liquid phase, with chlorin gas, in the presence of finely divided activated carbon.

2. The herein described method of chlorinating liquid paraffin hydrocarbons, which consists in treating a liquid paraffin hydrocarbon, in the liquid phase with chlorin gas, in the presence of finely divided batchite.

3. The herein described continuous method of chlorinating liquid paraffin hydrocarbons, which consists in continuously introducing liquid hydrocarbon and chlorin gas, into a closed receptacle, and causing them to pass through finely divided activated carbon, continuously draining off the chlorinated liquid, and continuously withdrawing the resulting vapors.

4. The herein described continuous method of chlorinating liquid paraffin hydrocarbons, which consists in continuously introducing liquid hydrocarbon and chlorin gas, into a closed receptacle, and causing them to pass through finely divided activated carbon, continuously draining off the chlorinated liquid, and continuously withdrawing the resulting vapors, and recirculating the chlorinated liquid with additional quantities of chlorin gas through the finely divided activated carbon.

5. The herein described continuous method of chlorinating liquid paraffin hydrocarbons, which consists in continuously introducing liquid hydrocarbon and chlorin gas, into a closed receptacle, and causing them to pass through finely divided activated carbon, continuously draining off the chlorinated liquid, and continuously withdrawing the resulting vapors, condensing the resulting vapors, adding the condensed liquid to the chlorinated liquid and recirculating the resulting liquid with additional quantities of chlorin gas through the finely divided activated carbon.

6. The herein described method of chlorinating liquid paraffin hydrocarbons, which consists in treating a liquid paraffin hydrocarbon, in the liquid phase, with chlorin gas, in the presence of finely divided activated carbon impregnated with nickel.

7. The herein described method of chlorinating liquid paraffin hydrocarbons which consists in treating a liquid paraffin hydrocarbon with chlorin gas, in the presence of a porous finely divided catalyzing material impregnated with nickel.

8. The herein described method of chlorinating liquid paraffin hydrocarbons, which consists in treating a liquid paraffin hydrocarbon with chlorin gas in the presence of finely divided batchite impregnated with nickel.

In testimony whereof I affix my signature.

GEORGE TROYER KOCH.